(No Model.)
C. B. LOCKWOOD.
PITMAN ROD CONNECTION.
No. 549,801. Patented Nov. 12, 1895.
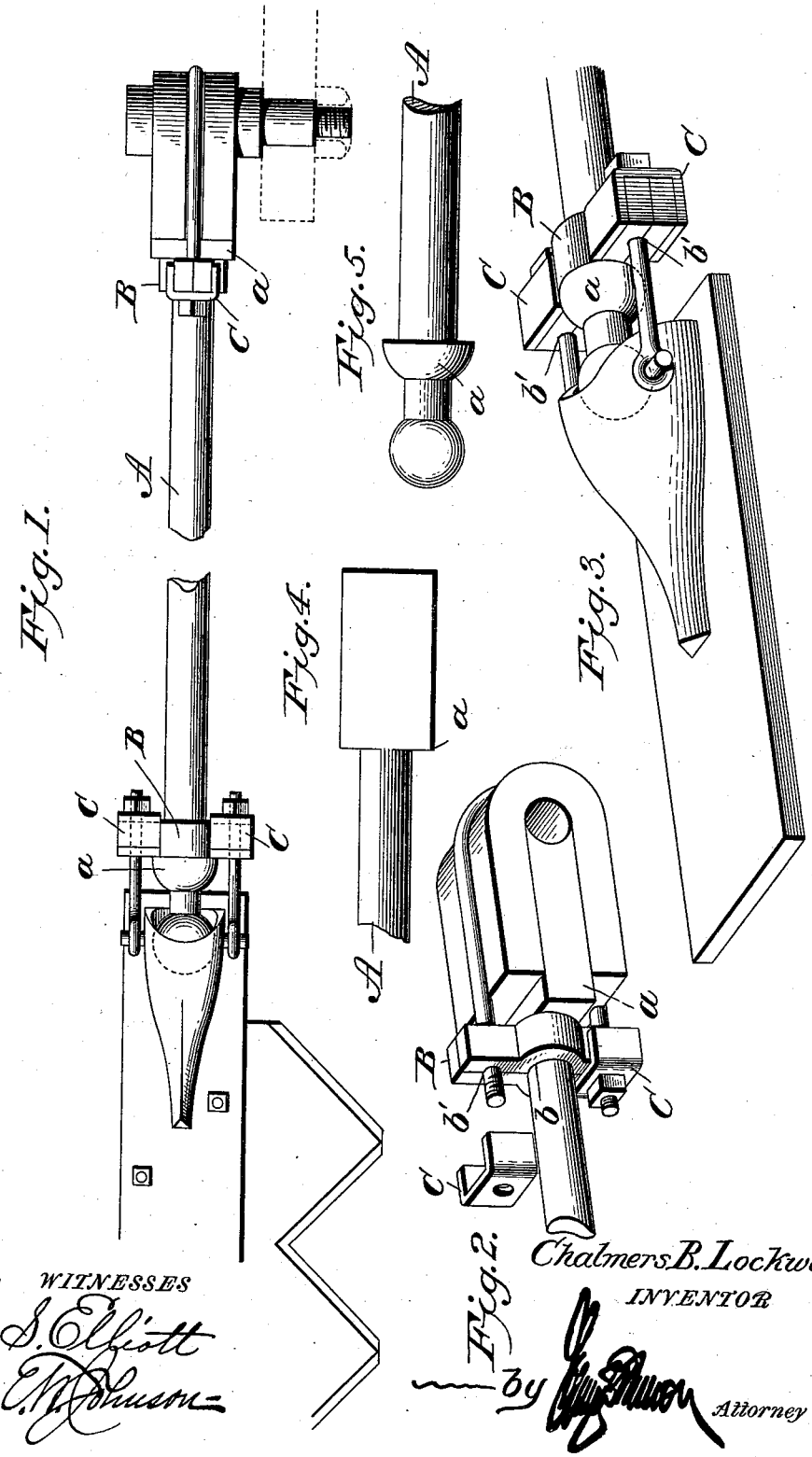

UNITED STATES PATENT OFFICE.

CHALMERS B. LOCKWOOD, OF DEEDSVILLE, INDIANA.

PITMAN-ROD CONNECTION.

SPECIFICATION forming part of Letters Patent No. 549,801, dated November 12, 1895.

Application filed September 5, 1895. Serial No. 561,526. (No model.)

*To all whom it may concern:*

Be it known that I, CHALMERS B. LOCKWOOD, a citizen of the United States of America, residing at Deedsville, in the county of Miami and State of Indiana, have invented certain new and useful Improvements in Pitman-Rod Connections; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in connections for pitman-rods; and it consists in providing the pitman-rod with a bearing flange or collar and a two-part yoke which embraces the pitman-rod and bears against the flange or collar, the yoke being provided with plates and apertures through which the tie-rods pass for connecting the parts securely to the slide or shaft, as will be hereinafter fully set forth, and particularly pointed out in the claim.

In the accompanying drawings, forming part of this specification, Figure 1 is a plan view showing my invention applied. Figs. 2 and 3 are perspective views of the yoke and apertured plates which connect the parts of the yokes together, and Figs. 4 and 5 are views of the ends of the pitman-rod.

A designates the pitman-rod, which is provided with a bearing flange or collar $a$, and B designates the yoke, which is made up of two parts provided in their adjoining faces with a central recess $b$, which embraces the pitman-rod, so that said yoke will bear against the collar or flange. The parts of the yoke are also provided near their outer ends with recesses, which form apertures through which the connecting-bolts pass.

C C designate plates which are bent so as to lie over opposite sides of the yoke, and these plates are provided centrally with an aperture which registers with the apertures $b'$. These plates not only serve to connect the parts of the yoke together, but also form bearings for the nuts on the ends of the tie-rods.

In Fig. 1 I have shown one form of pitman-connection in which one of the ends of the pitman-rod enters a bearing-yoke placed over the shaft, so that it can be drawn against the shaft by adjusting nuts on the ends of the tie-rods, the other end of the pitman-rod being shown connected to a slide having a socket with laterally-projecting lugs with which the eyes formed on the ends of the tie-rods engage. When the latter construction is used, the end of the pitman-rod is provided with a spherical portion which fits in the socket.

The device hereinbefore described provides a simple, cheap, and effective connection which admits of the ready removal of the pitman-rod by simply removing the nuts on the ends of the tie-rods and the connecting-plates C.

Having thus described my invention, what I claim as new, and desire to secure by Letters Patent, is—

The combination, with a pitman-rod having a bearing flange or collar near its end, of a yoke B made up of two parts which embrace the pitman-rod and bear against the flange or collar thereof, the end portions of the yoke being provided with apertures $b'$; and plates C bent to overlie the sides of the yoke and provided with apertures which register with the apertures $b'$; the ends of the tie-rods passing through the apertures and plates so that the tightening nuts will bear upon said plates, substantially as shown and for the purpose set forth.

In testimony whereof I affix my signature in presence of two witnesses.

CHALMERS B. LOCKWOOD.

Witnesses:
J. G. HARE,
GEO. N. LOCKWOOD.